United States Patent
Booker et al.

(10) Patent No.: US 6,173,882 B1
(45) Date of Patent: Jan. 16, 2001

(54) METHOD AND APPARATUS FOR HOLDING A WORKPIECE DURING WELDING

(75) Inventors: Kenneth Booker, Detroit; Mark R. Dunneback, Macomb Township; Joseph Guerra, Sterling Heights; Lianchun Mu, Novi; Enoch Nartey, Troy, all of MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/076,353

(22) Filed: May 12, 1998

(51) Int. Cl.[7] .................. B23K 31/12; B23K 26/00; B21J 13/08
(52) U.S. Cl. .................. 228/102; 228/103; 219/158; 219/121.63
(58) Field of Search .................. 219/121.63, 121.64, 219/21.82, 158; 228/102, 103

(56) References Cited

U.S. PATENT DOCUMENTS

| | | |
|---|---|---|
| 4,267,424 | 5/1981 | Shimatake et al. . |
| 4,425,073 | 1/1984 | Mattsson . |
| 4,447,697 | 5/1984 | Dunne et al. . |
| 4,568,816 | 2/1986 | Casler, Jr. . |
| 4,642,439 * | 2/1987 | Miller et al. .................. 219/121 LN |
| 4,647,155 * | 3/1987 | Bjorklund et al. .................. 350/252 |
| 4,652,719 | 3/1987 | Fujita et al. . |
| 4,670,641 | 6/1987 | Porsander et al. . |
| 4,707,582 | 11/1987 | Beyer . |
| 4,841,113 | 6/1989 | Hamada et al. . |
| 5,010,226 | 4/1991 | Sato et al. . |
| 5,099,098 * | 3/1992 | Burgoon .................. 219/60 A |
| 5,111,623 * | 5/1992 | Lehmann .................. 51/165.93 |
| 5,274,213 | 12/1993 | Sartorio . |
| 5,276,957 * | 1/1994 | Murphy et al. .................. 29/430 |
| 5,321,225 | 6/1994 | Boyer . |
| 5,340,960 | 8/1994 | Takasaki . |
| 5,388,129 * | 2/1995 | Hartley .................. 376/249 |
| 5,465,037 | 11/1995 | Huissoon et al. . |
| 5,484,975 | 1/1996 | Itatsu . |
| 5,489,758 | 2/1996 | Nihei et al. . |
| 5,528,011 | 6/1996 | Kono et al. . |
| 5,548,096 | 8/1996 | Akasaka et al. . |
| 5,582,747 | 12/1996 | Sakai et al. . |
| 5,621,672 | 4/1997 | Kobayashi et al. . |
| 5,901,426 * | 5/1999 | Okazaki et al. .................. 29/407.08 |

* cited by examiner

Primary Examiner—Patrick Ryan
Assistant Examiner—Cecilia Newsome
(74) Attorney, Agent, or Firm—Lawrence J. Shurupoff

(57) ABSTRACT

A workpiece is held at a welding station by several clamps during welding. After welding, the workpiece is transferred to a checking station where a determination is made of the actual location of critical points on the workpiece. The actual critical point locations are compared with ideal critical point locations to determine if there is any error in the manner in which the workpiece was held by the clamps. If an error is determined, one or more of the clamps are adjusted to compensate for the error when holding a subsequent workpiece for welding. Apparatus is also provided for carrying out the method of this invention.

3 Claims, 5 Drawing Sheets

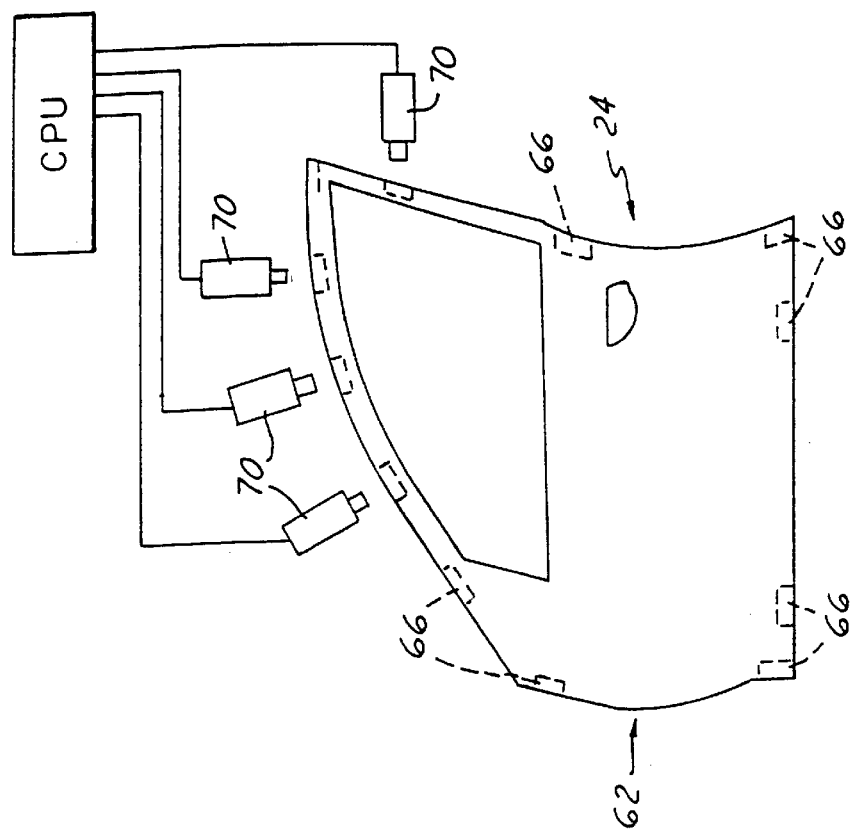
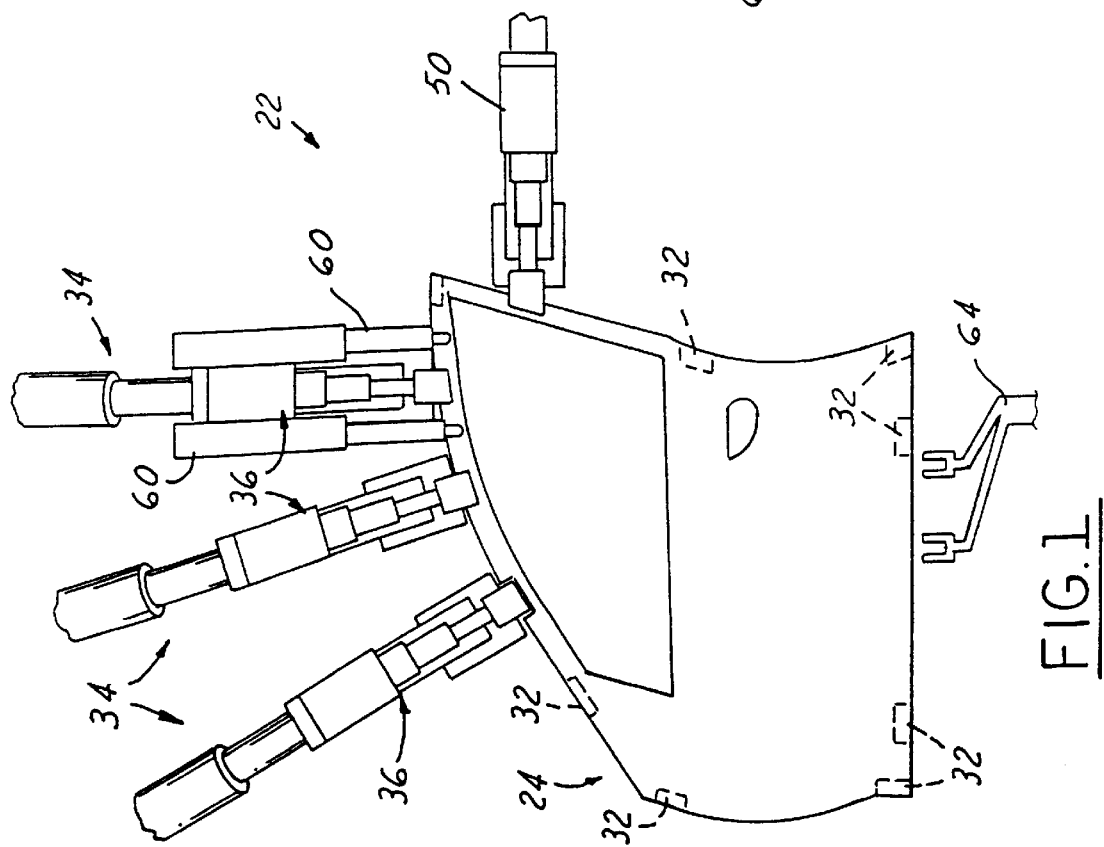

METHOD AND APPARATUS FOR HOLDING A WORKPIECE DURING WELDING

This invention relates generally to workpiece processing, and more particularly to the adjustment of clamps used to hold a workpiece in position during welding.

BACKGROUND OF THE INVENTION

The door of an automotive vehicle typically consists of an inner panel and an outer panel, both made of a resilient metal such as steel. The panels are preliminarily held together by overlapping flanges along the edges and then welded together at a welding station where the door is retained in a fixed position by several clamps.

It is essential that the door be held correctly without bending or flexing the panels, so that the geometry of the door is right for welding. Otherwise, when released after welding, the door may spring-back to a slightly warped condition. This may prevent the door, when installed in a vehicle, from sealing properly against the frame, producing wind noise, water leaks and an unsightly appearance. To eliminate the problem, the clamps used to hold the door during welding, or at least some of the clamps, must be adjusted. In the past, it has been necessary to make the adjustment manually by shimming the clamps. The operator made this adjustment based on his experience and judgment. This was very time-consuming and subject to error.

SUMMARY OF THE INVENTION

In accordance with the present invention, each clamp is mounted on a slide and can be adjusted back and forth along the slide by a motor. In practice, a workpiece such as a vehicle door is placed at the weld station on support pads and gripped by the clamps. After welding, the door is moved to a checking station where critical points on the door are measured. These measurements are preferably taken by laser optic cameras.

The measurement data is transmitted to a central processing unit (CPU) at an optical station where it is stored in a computer. The measurement data is then compared with ideal or "nominal" critical point locations to determine the error if any, that is, the departure of the measurement data from the ideal. If the departure or error is outside the maximum tolerance, the CPU will interpolate the data with an algorithm and determine the amount of clamp adjustment needed.

In an automatic system, the adjustment data is transmitted from the CPU to a servo-motor controller to actuate the motors to make the necessary adjustment in the position of one or more of the clamps. In a manual system, the CPU will merely record the error which an operator will interpret and then manually input the adjustment to the servo-motor controller. The adjustment can be made rapidly and with a high degree of accuracy. The adjustment causes one or more clamps to bend the workpiece into a profile or shape which corresponds to a preferred or ideal shape. The workpiece is then welded while held in this ideal profile.

One object of the invention is to provide method and apparatus for quickly and accurately adjusting the positions of clamps used to hold a workpiece during processing, having the foregoing features and capabilities.

Other objects, features and advantages will become more apparent as the following description proceeds, especially when considered with the accompanying drawings.

BRIEF DESCRIPTION OF THE DRAWINGS

FIG. 1 is a plan view showing a door supported at a welding station by support pads and clamping fixtures, in accordance with the invention.

FIG. 2 is a plan view of the door after it has been welded and transferred to a checking station for measurements by laser optic cameras.

DETAILED DESCRIPTION OF THE PREFERRED EMBODIMENTS

Figure 3:
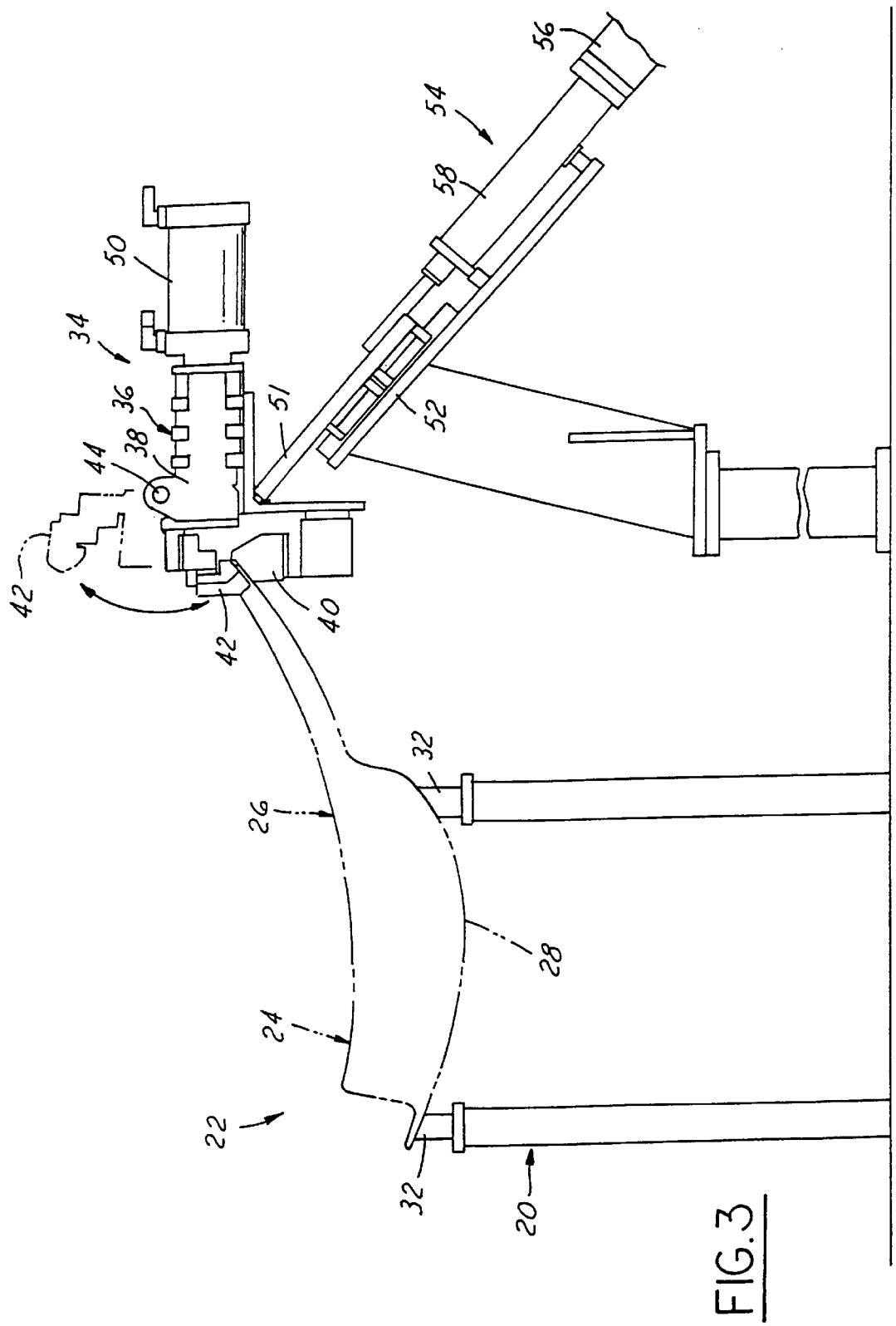
FIG. 3 is an elevational view showing the door supported at the welding station.
Figure 4:
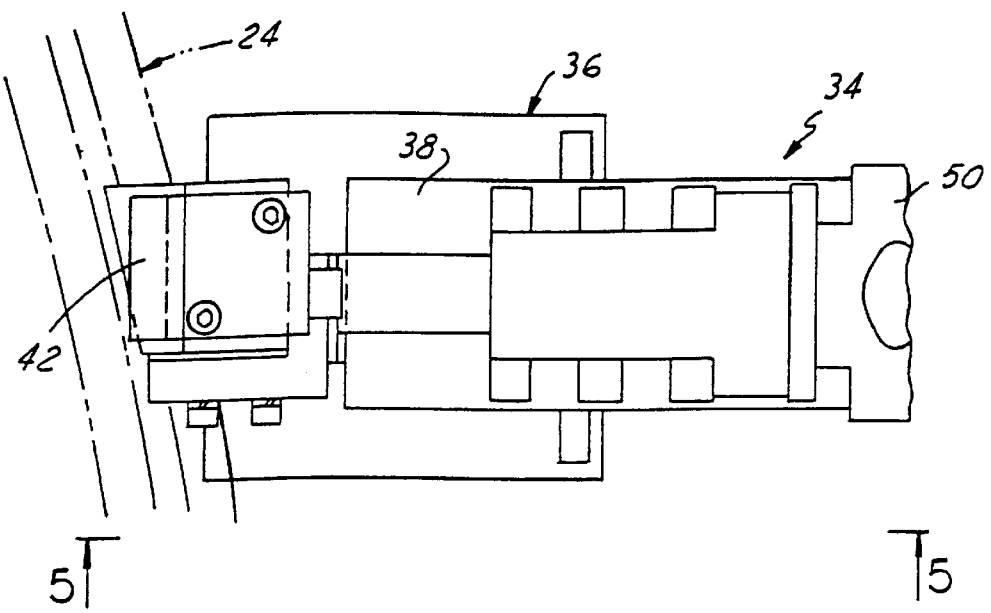
FIG. 4 is an enlarged, fragmentary plan view of one of the clamping fixtures.

Referring now more particularly to the drawings, there is shown a table (FIG. 3) 20 at a welding station 22 for holding a workpiece 24 for welding. The workpiece in this instance is an automotive vehicle door having an inner panel 26 and an outer panel 28. One of the panels has an integral flange 30 (FIG. 6A) along one or more edges which is bent over the corresponding edge or edges of the other panel to interconnect the two panels and hold them in a predetermined position relative to one another. The door panels are made of a flexible, resilient material, such, for example, as steel.

The door 24 in this condition is supported at the welding station by spaced apart support pads 32 (FIG. 3) and by spaced apart clamping fixtures 34. The clamping fixtures 34 abut and grip the edge of the door panel along the header portion thereof.

Figure 5:
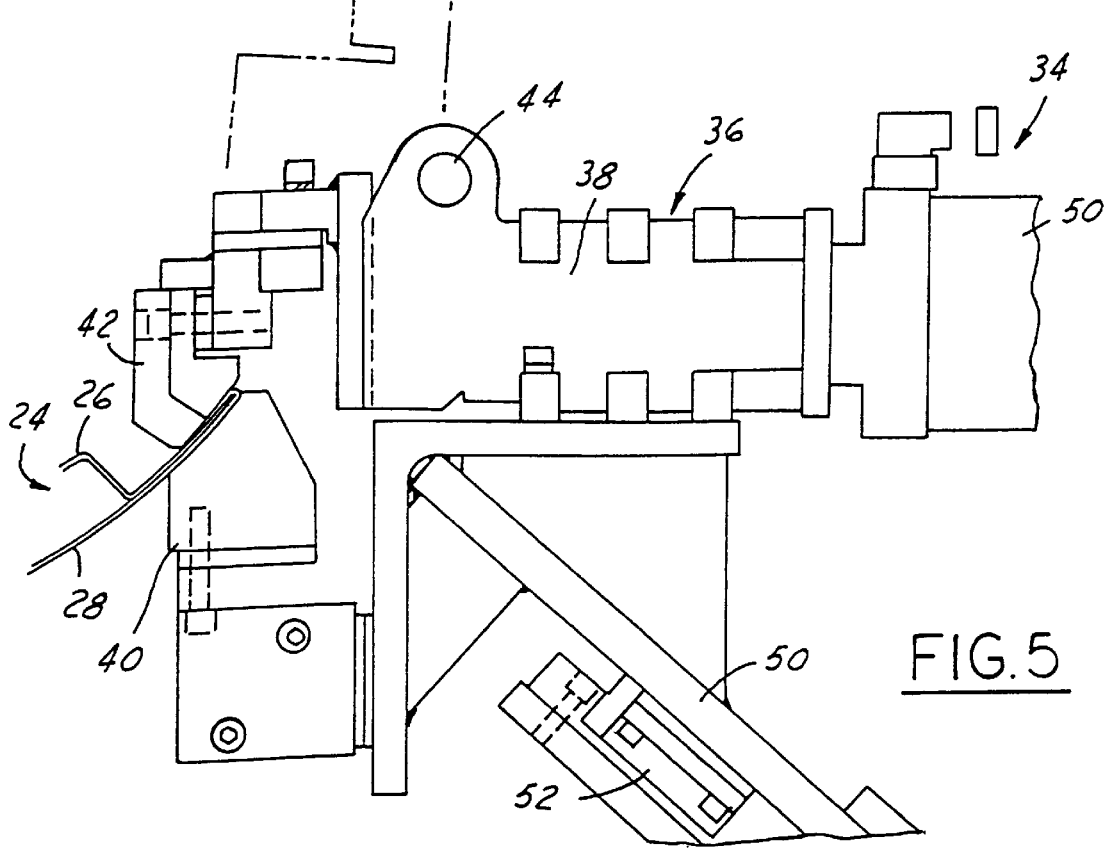
FIG. 5 is a view taken on the line 5—5 in FIG. 4 showing the clamp jaw closed in solid lines and open in broken lines.

Each clamping fixture 34 includes a clamp 36 having a clamp body 38 provided with a fixed jaw 40 and a pivoted jaw 42. The pivoted jaw 42 is connected to the clamp body 38 by a pivot pin 44 for swinging movement between open and closed positions. When the pivoted jaw 42 is in closed position, the header of the door is clamped between the pivoted jaw 42 and the fixed jaw 40 (FIGS. 3 and 5). When the pivoted jaw 42 is swung away from the fixed jaw 40, the door header is released. The pivoted jaw is swung between open and closed positions by a power cylinder 50 mounted on the clamp body.

The clamp body 38 of each clamp fixture 34 has a frame 51 mounted on a slide 52 for reciprocable sliding movement. A motor drive unit 54 is provided for reciprocating the clamp body. The motor drive unit 54 includes a reversible servo-motor 56 secured to the base of the slide 52 and a connection such as a ball screw drive or helical screw drive 58 from the motor 56 to the clamp body 38. By mounting the screw drive 58 at an inclined angle to the horizontal, gravity tends to pull the screw drive components together so as to eliminate backlash in the drive, and thereby improve drive accuracy.

Figure 7:
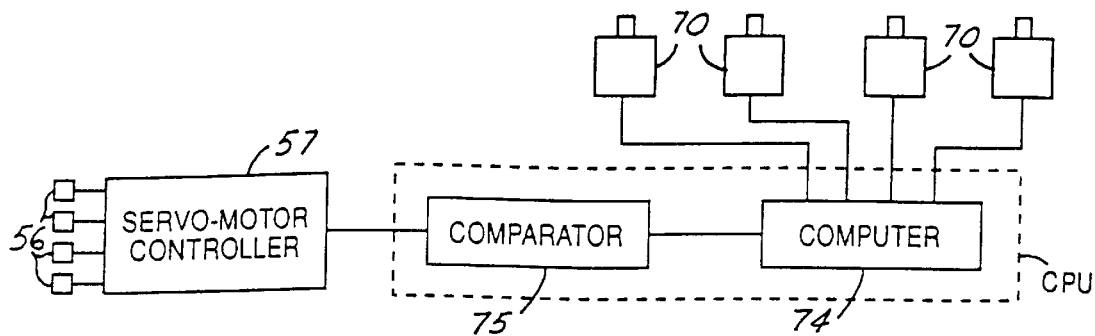
FIG. 7 illustrates hardware for controlling the clamps in an automatic system.
Figure 8:
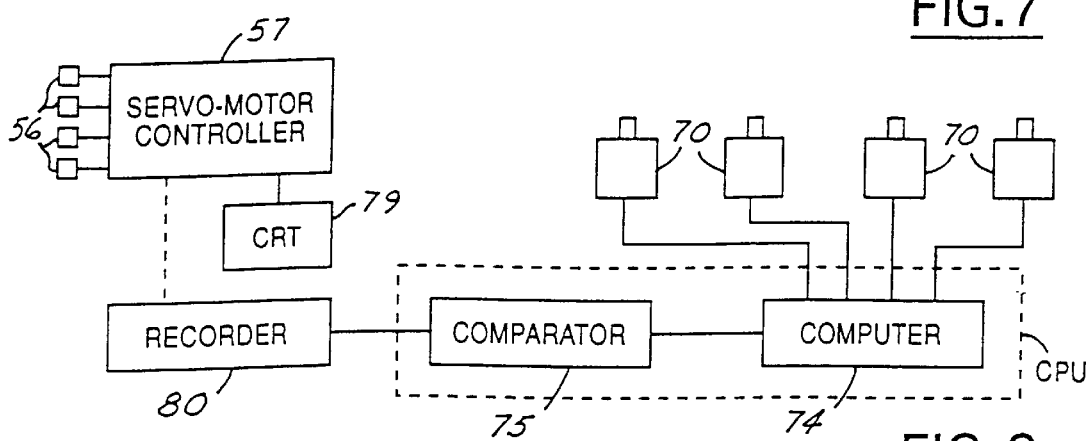
FIG. 8 illustrates the hardware for controlling the clamps in a manual system.

Operation of the motor 56 effects movement of the clamp 36 in one direction or the other along the slide 52 depending on the direction of operation of the motor. In this manner, the clamp 36 of each clamping mixture may be adjusted to a predetermined position for clamping the header of the door during welding. The midpoint of reciprocating travel of the clamp 36 may be set at a "nominal" location corresponding to a desired nominal or critical point on the finished welded door. In this manner, the clamp may provide maximum adjustment on opposite sides of the nominal or critical point. All of the motors 56 for the clamping fixtures 34 are operated by a single servo-motor controller 57 (FIGS. 7, 8). Although stepper motors can be used in place of servo motors, servo motors are preferred based on their greater accuracy and control.

Figure 6A:
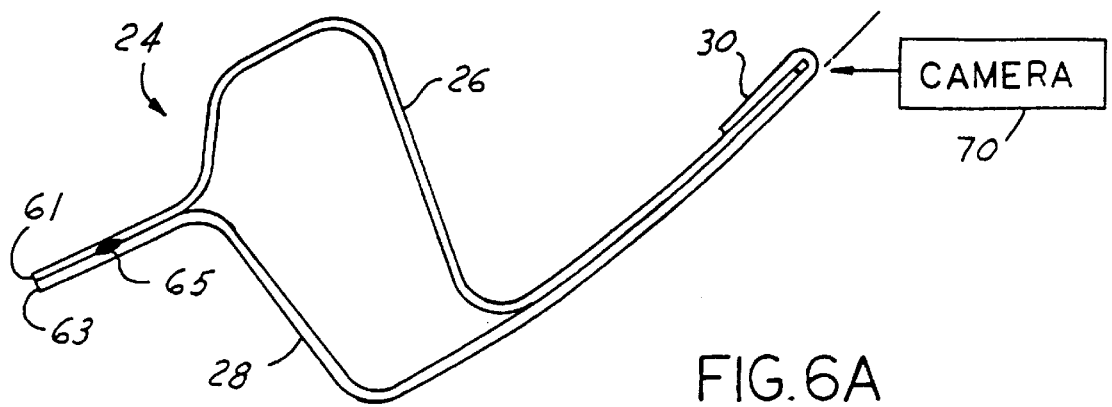
FIG. 6A is a sectional view of the door after welding.
Figure 6B:
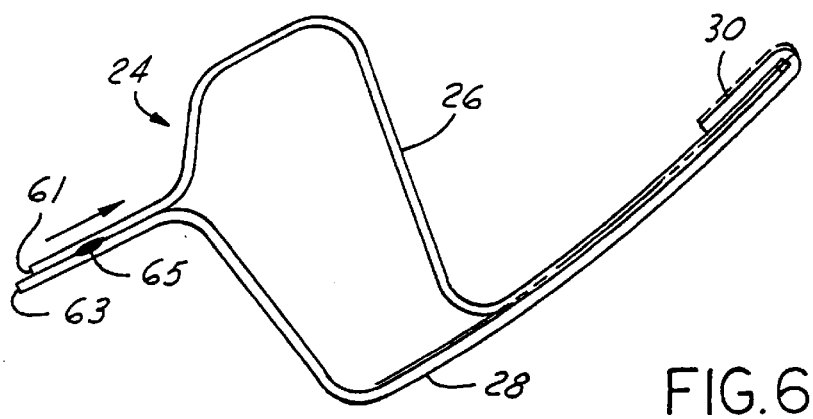
FIG. 6B is a view similar to FIG. 6A but shows a slight outward spring-back of the panels of the door from the ideal condition shown in broken lines.
Figure 6C:
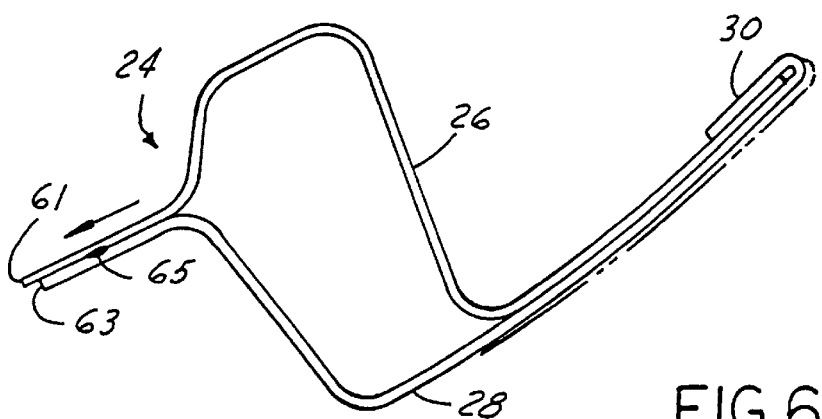
FIG. 6C is a view similar to FIG. 6A but shows a slight inward spring-back from the ideal shown in broken lines.

The panels 26 and 28 of the door, while the door is supported by the pads 32 and the clamps 36, are welded together at spaced points by welding devices, two of which are indicated at 60 in FIG. 1. If the door panels are properly and correctly supported during welding, there will be no appreciable spring-back of the door panels and the door will have the desired contour, configuration and orientation as shown in FIG. 6A. However, if the door after welding springs-back and assumes a slightly warped position such as shown in FIG. 6B or 6C, where the desired position is shown in broken lines, this indicates the need for an adjustment in the position of one or more of the clamps 36 so that subsequent doors will not be incorrectly held during welding. FIG. 6A shows the flush relationship of the edges 61 and 63 near a weld 65 of the door which was held correctly by the clamps. FIGS. 6B and 6C show the shift in these edges when the door is not held correctly.

To measure the contour and configuration of the door after welding and thereby determine if a clamp adjustment is required, the door is transferred to a checking station 62 (FIG. 2) by a transfer mechanism 64. The welded and transferred door is laid on support pads 66 of a table at the checking station and measured at certain critical points which are the same points where the door is gripped at the welding station by at least several and preferably three of the clamps 36. Measurement of the critical points is taken by laser optic cameras 70.

The measured data as thus generated by the laser optic cameras is transmitted to a central processing unit (CPU) at an optical station where this data is stored in a computer 74 for comparison by a comparator 75 with certain ideal or "nominal" critical point locations that have been entered. These nominal points correspond to a preferred contour of the door. The hardware for the storing of measurement data and comparison with ideal critical point locations and operation of the servo-motor controller 57 is shown schematically in FIGS. 7 and 8.

Figure 9:
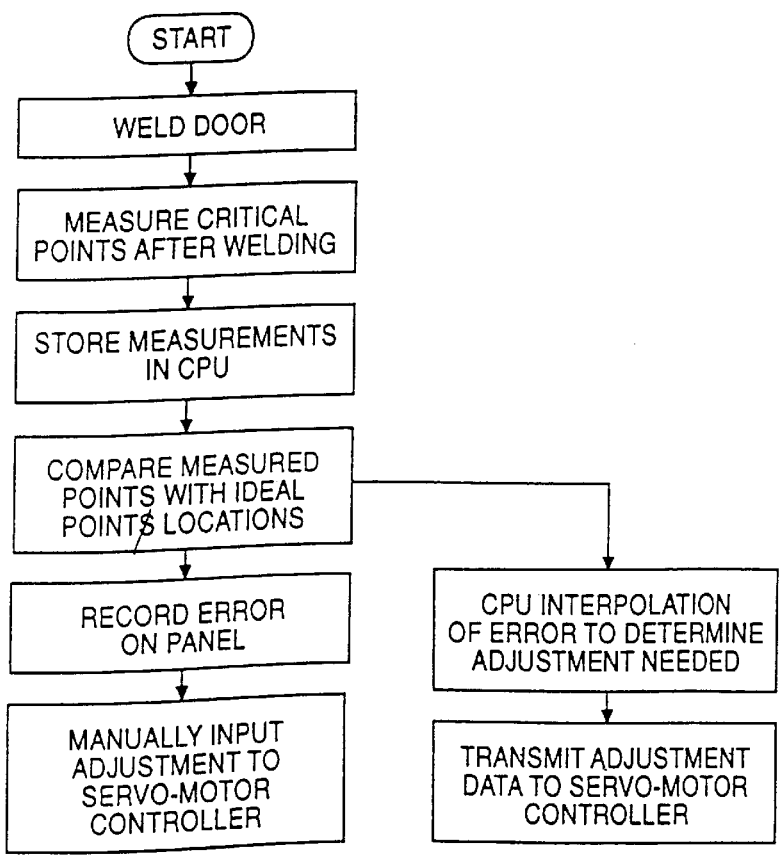
FIG. 9 is a flow diagram.

In use, the door 24 constructed from the assembled and joined door panels 26 and 28, is placed on the table at the welding station, resting on the support pads 32 and gripped by the clamps 34. The setting of the clamps determines the geometry of the door for welding and this setting occurs prior to closing the clamps on the door header. After welding, the clamps are opened to release the door and the door is transferred to the checking station 62 where it rests on the support pads 66. At the checking station, the laser optic cameras 70 take measurements of the specific critical points on the door header which were gripped by the clamps at the welding station. This measurement data is transmitted to the central processing unit (CPU) at the optical station. Such data is stored and compiled in the computer 74 for comparison with the ideal or nominal critical point locations. The comparison is made in the comparator 75. If the comparison is not within tolerance, then the computer will interpolate the data with an algorithm and produce an adjustment data signal indicative of the amount of adjustment needed for the individual clamps to corrects for the error. The adjustment data signal is automatically transmitted to the servo-motor controller 57 to actuate the motors 56 and make the necessary adjustment in the positions of one or more of the clamps (FIGS. 7 and 9). If accomplished manually, the error data is transmitted to a panel 80 from which an operator may read the error and then operate the servo-motor controller 57 via a manual CRT touch screen actuator 79 to actuate the motors 56 to adjust the individual clamps as needed (FIGS. 8 and 9).

What is claimed is:

1. A method of locating workpieces for welding comprising the steps of:

(a) providing a plurality of fixtures at a first station.

(b) holding a workpiece by said fixtures at a plurality of spaced critical points in a position for welding, (c) welding the workpiece while held by said fixtures, (d) after welding, transferring the workpiece to a second station, (e) at said second station, determining by optic means the actual location of each of said critical points, (f) generating measurement data indicative of such actual critical point locations, (g) comparing such measurement data of actual critical point locations with ideal critical point location data for each of said critical points to calculate the error, if any, in the position in which the workpiece was held by each of said fixtures during welding, (h) adjusting said fixtures to compensate for the error when holding a subsequent workpiece for welding, and wherein the optic means comprises a laser optic camera for each of such actual critical point locations.

2. The method of claim 1, further including interpolating the error calculation with an algorithm to produce an adjustment data signal indicative of the amount of adjustment needed for each fixture, and transmitting the adjustment data signal to a controller for adjusting said fixtures.

3. Apparatus for locating workpieces for welding comprising, a plurality of fixtures for holding a workpiece at a plurality of spaced critical points in a position for welding at a first station, means for welding the workpiece while held by said fixtures, means for transferring the workpiece to a second station after welding, means at said second station for determining by optic means the actual location of each of said critical points and generating measurement data indicative of such actual critical point locations, means for comparing such measurement data of actual critical point locations with ideal critical point location data for each of said critical points to calculate the error, if any, in the position in which the workpiece was held by said fixtures during welding, means for adjusting said fixtures to compensate for the error when holding a subsequent workpiece for welding, each of said fixtures comprising a workpiece clamp said means for adjusting said fixtures comprising means supporting each said clamp for reciprocable movement, means for moving each said clamp comprising a motor, a ball screw drive for moving each said clamp by said motor, and further including means for interpolating the error calculation with an algorithm to produce an adjustment data signal indicative of the amount of adjustment needed for each fixture, and means for transmitting the adjustment data signal to a controller for operating said motors to adjust said fixtures.

\* \* \* \* \*